US012654985B2

(12) United States Patent
Herkel et al.

(10) Patent No.: US 12,654,985 B2
(45) Date of Patent: Jun. 16, 2026

(54) AVOIDING ENTRAPMENT IN AN ELEVATOR

(71) Applicant: Otis Elevator Company, Farmington, CT (US)

(72) Inventors: Peter Herkel, Berlin (DE); Axel Pfeffer, Berlin (DE); Alexander Paetow, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 912 days.

(21) Appl. No.: 17/849,114

(22) Filed: Jun. 24, 2022

(65) Prior Publication Data

US 2023/0146745 A1 May 11, 2023

(30) Foreign Application Priority Data

Nov. 5, 2021 (EP) .................................... 21206805

(51) Int. Cl.
*B66B 1/00* (2006.01)
*B66B 5/00* (2006.01)
(Continued)

(52) U.S. Cl.
CPC ............ *B66B 5/0031* (2013.01); *B66B 5/027* (2013.01); *B66B 5/04* (2013.01); *B66B 5/16* (2013.01); *B66B 2201/40* (2013.01)

(58) Field of Classification Search
CPC ......... B66B 5/0031; B66B 5/04; B66B 5/027; B66B 5/16
(Continued)

(56) References Cited

U.S. PATENT DOCUMENTS 6,202,797 B1 3/2001 Skolnick et al.
7,954,606 B2 6/2011 Tinone et al.
(Continued)

FOREIGN PATENT DOCUMENTS

CN 101628676 A 1/2010
CN 1923659 B 11/2010
(Continued)

OTHER PUBLICATIONS

European Search Report for Application No. 21206805.0; Issued Mar. 28, 2022; 7 Pages.
(Continued)

*Primary Examiner* — Erick D Glass
(74) *Attorney, Agent, or Firm* — CANTOR COLBURN LLP

(57) ABSTRACT

An elevator system includes an elevator car, an elevator controller, and a safety controller, connected to a plurality of safety devices arranged to monitor the elevator system. The safety controller is configured to receive a signal in response to a change of state of any of the safety devices, and to determine a condition of the elevator system in response to the change of state of one or more of the safety devices. If the safety controller renders a determination that the elevator system is in a first condition, the safety controller causes an elevator brake to be deployed, preventing movement of the elevator car. If the safety controller renders a determination that the elevator system is in a second condition, the safety controller allows movement of the elevator car for a predetermined duration or until the elevator car has travelled a predetermined distance.

15 Claims, 3 Drawing Sheets

(51) Int. Cl.
*B66B 5/02* (2006.01)
*B66B 5/04* (2006.01)
*B66B 5/16* (2006.01)

(58) Field of Classification Search
USPC .......................................................... 187/316
See application file for complete search history.

(56) References Cited

U.S. PATENT DOCUMENTS

| | | | | |
|---|---|---|---|---|
| 10,427,908 | B2 * | 10/2019 | Krishnamurthy | B66B 5/02 |
| 10,526,168 | B2 | 1/2020 | Litteral et al. | |
| 2019/0389695 | A1 * | 12/2019 | Monzon | B66B 5/16 |
| 2021/0122610 | A1 | 4/2021 | Arnold et al. | |
| 2021/0284499 | A1 * | 9/2021 | Siironen | B66B 3/002 |
| 2021/0316961 | A1 | 10/2021 | Roussel et al. | |
| 2022/0380173 | A1 * | 12/2022 | Tegtmeier | B66B 5/0031 |
| 2024/0417217 | A1 * | 12/2024 | Hirabayashi | H02P 29/68 |

FOREIGN PATENT DOCUMENTS

| | | | |
|---|---|---|---|
| CN | 202657778 | U | 1/2013 |
| CN | 103889873 | A | 6/2014 |
| CN | 108529368 | A | 9/2018 |
| CN | 210103219 | U | 2/2020 |
| CN | 113371569 | A | 9/2021 |
| EP | 1281654 | A1 | 2/2003 |
| EP | 1110900 | B1 | 7/2005 |
| EP | 2229335 | | 9/2010 |
| EP | 2623452 | A1 | 8/2013 |
| EP | 1882666 | B1 | 10/2013 |
| EP | 3184477 | A1 | 6/2017 |
| EP | 3357851 | A1 | 8/2018 |
| EP | 3434634 | A1 | 1/2019 |
| EP | 3599203 | A1 | 1/2020 |
| EP | 3640184 | A1 | 4/2020 |
| EP | 2421784 | B1 | 2/2021 |
| EP | 3687929 | B1 | 3/2022 |
| IN | 201814028176 | A | 7/2018 |
| JP | 3143889 | B2 | 3/2001 |
| WO | 0051929 | A1 | 9/2000 |
| WO | 2017068232 | A1 | 4/2017 |
| WO | 17081789 | A1 | 5/2017 |

OTHER PUBLICATIONS

Chinese Office Action for Application No. 202210687008.4, Issued Apr. 11, 2025, 10 Pages.

* cited by examiner

AVOIDING ENTRAPMENT IN AN ELEVATOR

This application claims priority to European Patent Application No. 21206805.0, filed Nov. 5, 2021, and all the benefits accruing therefrom under 35 U.S.C. § 119, the contents of which in its entirety are herein incorporated by reference.

TECHNICAL FIELD

This disclosure generally relates to an elevator system including a safety system configured to prevent entrapment of a maintenance person or elevator passenger(s) due to the elevator car being stopped between floors in an elevator hoistway, e.g. in the event that a fault occurs in the elevator system. There is also disclosed a corresponding method of controlling an elevator system.

BACKGROUND OF THE DISCLOSURE

It is known to provide a safety controller within an elevator system that monitors the status of the elevator system using a plurality of electric safety devices connected in series in a safety chain. Each safety device corresponds to a particular component of the elevator system, e.g. a sensing device such as a door sensor detecting whether a door lock has engaged. In conventional elevator systems, in the event that one of the safety devices in the safety chain detects a fault, the corresponding safety contact is opened, causing the safety chain to be disrupted. This causes the safety controller to automatically stop the elevator machine and deploy a brake, immediately arresting its motion. After deployment of the brake, the elevator car is stopped within the hoistway, and is unable to move until the fault associated with the open safety contact of the safety chain is fixed.

If the elevator car is between floors when a brake is triggered in response to disruption of the safety chain, entrapment of passengers within the elevator car (during normal operation) or a maintenance person on the roof of the car (during inspection) may occur.

The present disclosure seeks to address such issues.

SUMMARY

According to a first aspect of this disclosure, there is provided an elevator system, comprising: an elevator car and a drive system configured to drive movement of the elevator car; an elevator controller, configured to control operation of the elevator car; a safety controller; and a plurality of electric safety devices connected to the safety controller, wherein the plurality of safety devices monitor the elevator system; wherein the safety controller is configured to receive a signal in response to a change of state of any of the safety devices; wherein, after receiving a signal in response to a change of state of one or more of the safety devices, the safety controller determines a condition of the elevator system; wherein if the safety controller renders a determination that the elevator system is in a first condition, the safety controller causes an elevator brake to be deployed, preventing movement of the elevator car; and wherein if the safety controller renders a determination that the elevator system is in a second condition, the safety controller allows movement of the elevator car for a predetermined duration or until the elevator car has travelled a predetermined distance.

According to a second aspect of the present disclosure, there is provided a method of controlling an elevator system comprising an elevator car, an elevator controller, and a safety controller connected to a plurality of safety devices arranged to monitor the elevator system, the method comprising: receiving a signal indicating that a change of state of at least one of the safety devices has occurred; and determining a condition of the elevator system based on the change of state; wherein in response to a determination that the elevator system is in a first condition, the method further comprises: causing an elevator brake to be deployed; and preventing movement of the elevator car; and wherein in response to a determination that the elevator system is in a second condition; the method further comprises: allowing movement of the elevator car for a predetermined duration or until the elevator car has travelled a predetermined distance.

In an elevator system and method as disclosed herein, the condition of the elevator system can be determined by the safety controller in response to receiving a signal indicating a change in state of one or more safety devices, which may be indicative of a fault in the elevator system. After the condition of the elevator system is determined, movement of the elevator car can be controlled in response to the condition of the elevator system. If the elevator system is determined to be in a first condition (e.g. indicating that a safety-critical fault is present), the elevator brake is activated and the elevator car is stopped immediately, as is conventional.

However, if the elevator system is determined to be in a second condition (e.g. indicating that a fault has occurred, but that the fault is not safety-critical), the elevator car is allowed to move for a predetermined time or distance, e.g. to the nearest landing. Allowing the elevator car to move in this way may allow passengers located within the elevator car or a maintenance person located on the roof of the elevator car (referred to in the following collectively as elevator car occupants) to exit the elevator car at the landing. The operation of the system as disclosed herein relies on recognition of the fact that in certain circumstances, although a safety device may change state, potentially due to a fault in the elevator system, the level of risk associated with certain faults is sufficiently low to allow a car movement for a limited distance or time in order to prevent entrapment of elevator car occupants.

In some examples, after receiving a signal in response to a change of state of one or more of the safety devices and rendering a determination that the elevator system is in the second condition, the safety controller causes an elevator brake to be deployed after the predetermined duration has elapsed or after the elevator car has travelled the predetermined distance. Thus, once the car has moved for a predetermined time or distance, e.g. to the nearest landing, the brake is activated, in order to prevent a hazardous situation occurring in the event that a fault were to occur in the elevator system. Deploying the elevator brake after a predetermined duration has elapsed or after the elevator car has moved a predetermined distance ensures that any further operation of the elevator car is prevented following a change of state of one or more safety devices, which may be indicative of a fault in the elevator system. Preventing movement of the elevator car before it is able to travel a significant distance within an elevator hoistway reduces the likelihood of faults occurring in the elevator system, potentially leading to a hazardous situation, and hence aims to minimise the risk to car occupants. The predetermined distance may be set to allow the elevator car to travel to a nearby landing. For example, the predetermined distance may be set such that the elevator car can travel to the closest landing within the elevator hoistway. In a preferred embodiment, the predetermined distance may be up to 15 metres, e.g. allowing the elevator car to travel to any landing within a range of 15 metres. The predetermined time may be between one and five minutes, for example about three minutes.

In some examples, the safety controller is arranged to move the elevator car to the nearest landing upon rendering a determination that the elevator system is in the second condition. Moving the elevator car to the nearest landing may allow car occupants to exit the elevator car at a landing at the earliest opportunity, in order to prevent entrapment of elevator car occupants that may occur in conventional elevator systems if the elevator car is stopped between landings. This may serve to reduce the level of risk experienced by the elevator car occupants when compared to conventional approaches.

In some examples this movement may be automatic, i.e. performed by the safety controller in response to determining that the elevator system is in the second condition. In some other examples, this movement may be performed manually by a maintenance person, who may provide an instruction to the safety controller to move the elevator car to the nearest landing. Such instruction may be sent from an elevator inspection control box, which may be located on the roof of the elevator car. The inspection control box may include an inspection operation switch which is manually operable to bring the control box into operation. This can be a bi-stable switch, so as to protect against involuntary operation.

It will be appreciated that movement of the elevator car may be independently controlled by either of the safety controller (following operation of one of the electric safety devices or during inspection operation) and the elevator controller (during normal operation). For example, the elevator controller is connected to the drive system in order to control normal operation of the elevator car (e.g. to move the car between landings in response to passenger requests for service) and the safety controller is independently connected to the drive system in order to control movement of the elevator car at other times (e.g. in response to a change of state of any of the safety devices, or e.g. during an inspection or maintenance mode when a maintenance person in riding on top of the car). The drive system may include a drive motor and a motor brake.

In various examples, the safety controller is arranged to deploy such a motor brake, also known as the "machine brake", so as to stop any further driven movement of the elevator car. Thus the elevator brake disclosed above may be a brake in the drive system. In various examples, the safety controller is directly connected to the drive system and arranged to deploy a brake in the drive system following determination of whether the elevator system is in a first condition or a second condition. In addition, the safety controller may also be directly connected to one or more elevator car safety brakes and arranged to deploy the elevator car safety brakes upon determining that the first condition is an overspeed condition.

In some examples, each of the plurality of safety devices is connected to the safety controller by a common bus, to form a safety chain for the elevator system. The safety controller may be part of a safety system, the safety system also comprising bus nodes, which are connected to the bus, wherein the bus is connected to the safety controller, and the bus nodes are connected to the safety devices, e.g. with a dedicated bus node for each safety device. The bus may be a Controller Area Network (CAN) bus. However, any other suitable communication means may be employed to connect the safety controller to the safety devices. The safety controller may include a microprocessor, which may run software. The microprocessor may poll the bus nodes, e.g. at regular intervals, to obtain the individual status information (i.e. current state) of the safety devices.

In some examples, one or more of the plurality of safety devices are safety contacts, and a change of state of an individual safety contact occurs in response to positive separation of the contact from its safety circuit, e.g. the safety contact operates as a switch being opened or closed. The plurality of safety devices may be a physical set of safety contacts or switches, or alternatively may be a virtual set of safety contacts or switches embedded in software within the safety controller. In some examples, one or more of the plurality of safety devices are safety sensors, configured to detect a condition of a component in the elevator system. In such examples, a change in state of an individual safety device may occur in response to the sensor detecting that a predetermined condition has been met. In one non-limiting example, the safety chain includes a safety sensor arranged for overspeed detection. Such a safety sensor may comprise one or more position or velocity sensors, and the predetermined condition may be a threshold speed of the elevator car.

The plurality of safety devices may therefore be used to monitor the elevator system. Any of the plurality of safety devices may be a physical set of contacts or switches, for example a limit switch arranged in the hoistway, or alternatively may be a virtual set of contacts or switches embedded in software within the safety controller. The plurality of safety devices may include at least one stopping device (e.g. an emergency stop button) provided for stopping and maintaining the elevator car out of service. Such a stopping device may be located in the pit, in the machine room (where provided), and/or on the car roof, within reach of the inspection control box or at the inspection control box.

In some examples, after receiving a signal in response to a change of state of one or more of the safety devices, the safety controller causes an alarm to be triggered. The alarm may provide a visual and/or audible indicator to elevator car occupants in the vicinity, e.g. in the form of a light and/or a buzzer, in order to inform them of a potential fault in the elevator system. In some examples in which the elevator car is in normal operation and may therefore contain passengers, the alarm may be provided to passengers within the elevator car. In some examples, in which the elevator car is being operated by a mechanic, e.g. in an inspection mode, the alarm may be located within the elevator hoistway, or may be located in the vicinity of a control box situated on the roof of the elevator car.

In at least some examples, the elevator system may comprise a position determination system connected to the elevator controller and/or safety controller. The position determination system may be any position reference system that is capable of outputting a position of the elevator car within the hoistway. For example, the position determination system may comprise an encoder associated with the drive system, which is capable of outputting a position of the elevator car within the hoistway based on measurements related to the movement of a drive motor. In some examples, the position determination system is an absolute position determination system, i.e. which accurately determines the absolute position of the elevator car relative to a hoistway in which the elevator car travels. In some examples, the absolute position of the elevator car may be analysed to determine an overspeed condition of the elevator car.

In some such examples, at least one of the plurality of safety devices is connected to a position determination system configured to detect the speed of the elevator car, e.g. an overspeed detection device configured to change state if the elevator car speed is determined to be greater than a threshold speed. In such examples, the safety controller is configured to receive a signal in response to the change of state of the overspeed detection device, to determine that an overspeed condition is present in the elevator system, and to immediately cause an elevator car safety brake to be deployed. The first condition may therefore be an overspeed condition.

In some examples of methods disclosed herein, upon determining that the elevator system is in the second condition, the method may further comprise causing an elevator brake to be deployed after the predetermined duration has elapsed or after the elevator car has travelled the predetermined distance.

In some examples of methods disclosed herein, upon determining that the elevator system is in the second condition, the method may further comprise moving the elevator car to the nearest landing.

In some examples of methods disclosed herein, moving the elevator car may further comprise receiving a command input from an inspection operation control box, and the method may further comprise moving the elevator car in response to the command.

In some examples of methods disclosed herein, upon receiving a signal in response to a change of state of one or more of the safety devices, the method may further comprise triggering an alarm.

In some examples of methods disclosed herein, in which at least one of the plurality of safety devices is connected to a position determination system, the method may further comprise detecting, using the position determination system, the speed of the elevator car, determining if the speed of the elevator car is greater than a threshold, causing the at least one safety device to change state if the speed of the elevator car is greater than the threshold, receiving, a signal in response to the change of state of the at least one safety device, determining that the first condition is an overspeed condition, and causing an elevator car safety brake to be deployed.

Features of any aspect or embodiment described herein may, wherever appropriate, be applied to any other aspect or embodiment described herein. Where reference is made to different examples or sets of examples, it should be understood that these are not necessarily distinct but may overlap.

BRIEF DESCRIPTION OF THE DRAWINGS

Certain preferred examples of this disclosure will now be described, by way of example only, with reference to the accompanying drawings, in which.

DETAILED DESCRIPTION

Figure 1:
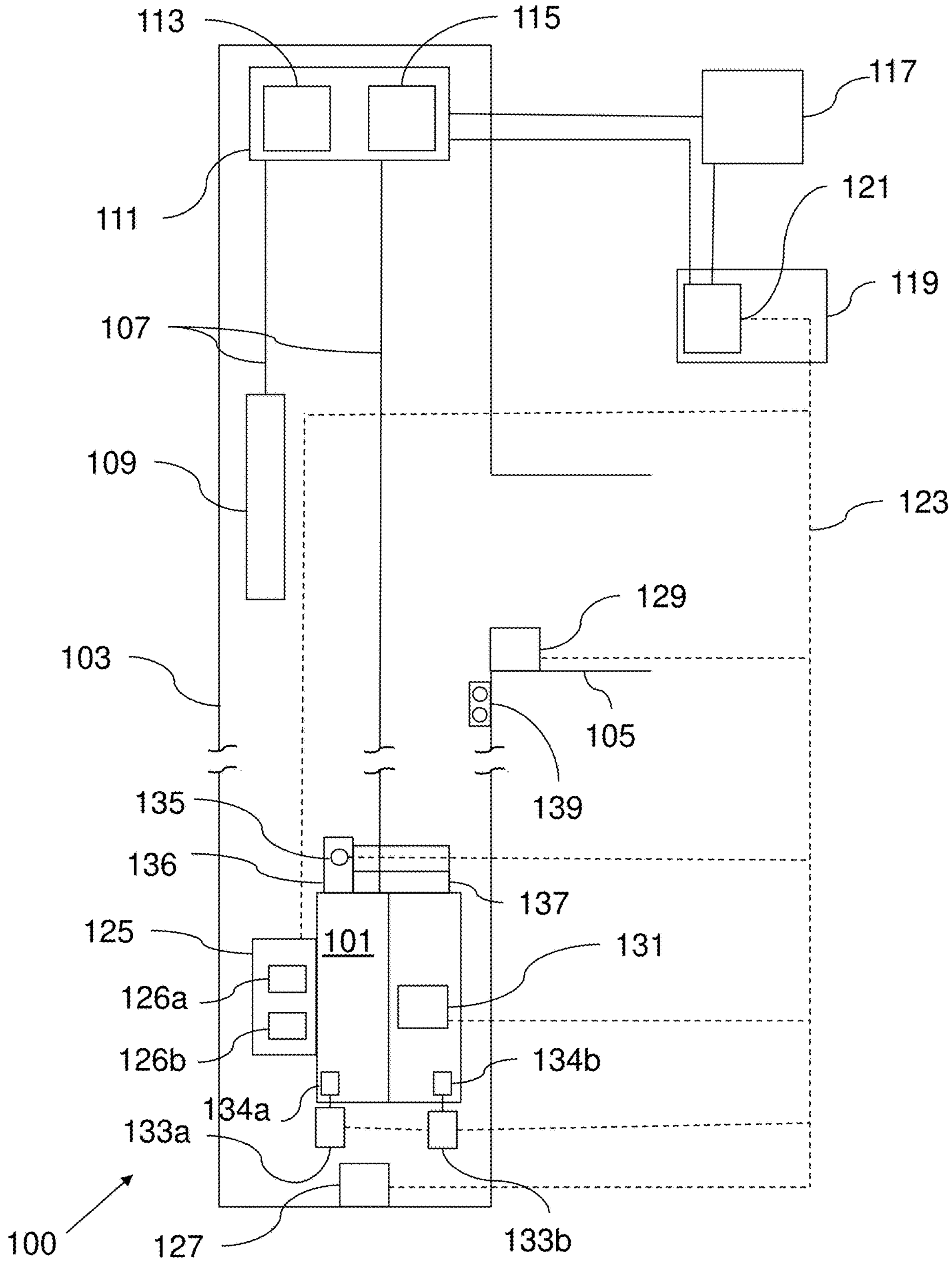
FIG. 1 is a schematic view of an elevator system according to an example of the present disclosure.

FIG. 1 illustrates an elevator system 100 comprising an elevator car 101 that runs in a hoistway 103 between various landings 105 of a building. Although a single landing 105 is shown for illustrative purposes, it will be appreciated that more landings are present within the building but are not shown in FIG. 1 for simplicity. The elevator car 101 is suspended in the hoistway 103 by the first end of a tension member 107 (e.g. one or more ropes or belts). The second end of the tension member 107 is connected to a counterweight 109. The elevator car 101 and the counterweight 109 are moving components in the elevator system 100. Although the elevator car 101 and the counterweight 109 shown in FIG. 1 are connected by a tension member 107, it will be appreciated that in other examples the elevator system may be ropeless.

During normal operation, the elevator car 101 travels up and down in the hoistway 103 to transport passengers and/or cargo between landings 105 of the building. The elevator car 101 is driven by a drive system 111 comprising a drive motor 113 and a motor brake 115. The tension member 107 passes over a drive sheave (not shown) that is driven to rotate by the drive motor 113 and braked by the motor brake 115. Normal operation of the drive system 111 is controlled by an elevator controller 117.

The elevator system 100 also comprises a safety system 119, including a safety controller 121 connected to a bus 123. The safety controller 121 is connected, via the bus 123, to various safety devices, as will be described in the following. The safety controller 121, bus 123 and the plurality of safety devices together form a safety chain as is known in the art, such that if any of the safety devices changes state (e.g. a safety switch changes from a closed position in which the safety chain is intact, to an open position in which the safety chain is broken), a signal is received by the safety controller 121, which may then take appropriate action as described below. It is therefore understood that the safety controller 121 is connected to a plurality of safety devices that monitor the elevator system 100. Some exemplary safety devices 126*a*, 126*b*, 127, 129, 131, 138*a*, 138*b*, 140, 141 are described below, but the elevator system 100 may include any required number N of safety devices.

The elevator system 100 includes a position determination system in the form of an absolute position reference system 125, configured to determine the absolute position and velocity of the elevator car 101 in the hoistway 103, and to output a measurement of the absolute position and velocity of the elevator car 101 to the safety controller 121 over the bus 123. The absolute position reference system 125 is connected to the safety controller 121, via the bus 123, by two APRS safety devices 126*a*, 126*b*, in order to provide redundancy in the measurement of the position and velocity of the elevator car 101. The APRS safety devices 126*a*, 126*b* may change state in the event that the absolute position reference system 125 determines an overspeed condition of the elevator car 101. The absolute position reference system 125 may interact with a coded tape (not shown) extending at least part of the way along the hoistway 103 and include two sensors (not shown) mounted on the elevator car 101 and arranged to read the coded tape to determine the absolute position and velocity of the elevator car 101 in the hoistway 103.

The elevator system 100 also comprises a pit safety device 127, associated with a stopping device in the elevator pit, which may change state when a maintenance person is detected as working in the elevator pit. The elevator system 100 further comprises a hoistway door safety device 129, which may change state in the event that the hoistway door is open/not fully closed while the elevator car 101 is not present at the landing 105 at which the hoistway door is located, and a car door safety device 131, which may change state in the event that the elevator car door is open/not fully closed while the elevator car 101 is not present at any landing 105.

The elevator system 100 also includes electronic safety actuators 133*a*, 133*b*, connected to respective safety brakes 134*a*, 134*b*. The electronic safety actuators 133*a*, 133*b* are expected to remain connected to the safety controller 121 at all times in order to ensure that emergency stopping of the elevator car 101 is possible. To monitor this, the electronic safety actuators (ESAs) 133*a*, 133*b* may each include an ESA safety device 138*a*, 138*b* that changes state in the event that connection to the safety controller 121 is lost.

The elevator system 100 further includes a safety device 140 of an emergency stop button 135 located on the roof of the elevator car 101, which may change state if a mechanic operates the emergency stop button 135 when working on the roof the elevator car 101. The emergency stop button 135 may be connected to, or form part of, an inspection operation control box 136 located on the roof of the elevator car 101, operable by elevator maintenance personnel to control operation of the elevator car 101 in an inspection mode. Commands may be input through the elevator inspection operation control box 136 and provided to the safety controller 121 in order to control the movement of the elevator car 101, for example when operating in an inspection mode. The emergency stop button 135 is located proximate to a safety barrier 137, which forms a physical barrier at the edges of the elevator car 101, and is arranged to protect the maintenance person from falling into the elevator hoistway 103 when working on the roof of the elevator car 101.

It will be appreciated that further safety devices may be present in the elevator system 100 in some examples, such as safety devices connected to, for example, temperature sensors or further command buttons which may be operated by elevator maintenance personnel from different locations in the elevator car 101 or elevator hoistway 103.

Each of the safety devices 126*a*, 126*b*, 127, 129, 131, 138*a*, 138*b*, 140, 141 described above is connected to the safety controller 121 (through the bus 123) via one or more respective bus nodes (not shown in FIG. 1), such that the safety controller 121 is able to monitor the elevator system 100, and take action in response to changes, i.e. a signal resulting from a change of state of one or more of the safety devices (e.g. a transition from a 'closed' state to an 'open' state for a safety switch) as will be described in the following. The safety controller 121 is also connected to the elevator controller 117, with a two-way communications lines, such that the elevator controller 117 can request and receive status information from the safety controller 121 indicative of the status of the various safety devices of the elevator system 100.

Based on the signals received from the safety devices (i.e. whether the state of any safety device has changed, potentially indicating a fault in the elevator system 100), the safety controller 121 is configured to determine the condition of the elevator system 100. The safety controller 121 is further configured to perform appropriate stopping of the elevator car 101 based on the determined condition.

Detection of a change of state of one of the safety devices of the elevator system 100 using the safety controller 121 will now be described with reference to FIG. 2, which shows the safety system 119 of the elevator system 100 in greater detail, together with associated components.

It can be seen in FIG. 2 that the safety system 119 comprises the safety controller 121, which is in signal communication with the safety devices described above via the bus 123 (represented by a dashed line in FIG. 2), and a plurality of bus nodes associated with the respective safety devices, as will be described in the following.

The absolute position reference system safety devices 126*a*, 126*b* and safety devices 138*a*, 138*b* associated with the electronic safety actuators 133*a*, 133*b*, are connected to the safety controller 121 via a pair of APRS nodes 226*a*, 226*b*, and a pair of safety brake actuator nodes 233*a* and 233*b*, respectively. The APRS safety devices 126*a*, 126*b* and ESA safety devices 133*a*, 133*b* are both connected to the bus 123 by a pair of nodes, as both systems comprise two safety devices in order to provide redundancy in operation. However, other safety devices are connected to the safety controller 121 by a single node. For example, the hoistway door safety devices 129 and the car door safety devices 131 are connected to the safety controller 121 via the bus 123 by a single hoistway door node 229 and a single car door node 231, respectively. Similarly, the pit safety device 127 and the emergency stop button safety device 140 are connected to the safety controller 121 via the bus 123 by a single pit safety device node 227 and a single emergency stop button node 240, respectively. The safety controller 121 may, in some examples, also be connected to additional safety devices, represented here by the 'Nth relevant safety device' 141, which is connected to the safety controller 121 over the bus 123 by an 'Nth relevant safety device node' 241.

In addition to its connection to the bus 123, the safety controller 121 is also connected to the elevator controller 117, to the drive system 111 (comprising the drive motor 113 and the motor brake 115), and to the ESAs 133*a*, 133*b* that can trigger the elevator safety brakes 134*a*, 134*b*, such that it may perform appropriate control of the elevator car 101 based on the determined condition of the elevator system.

In conventional operation of an elevator system 100, in response to determination of a fault during normal operation (i.e. through the opening of a safety switch or other change in state of a safety device), a stopping operation is initiated by the safety controller 121. For example, if it is determined that a hoistway door is open while the elevator system 100 is running (e.g. if the hoistway door safety device 129 has been opened), or it is determined, by the absolute position reference system 125, that the elevator car 101 is travelling too quickly within the hoistway 103, a stopping operation is immediately performed by the safety controller 121.

When such a stopping operation is performed, power to the elevator drive motor 113 is disconnected, and the motor brake 115 of the elevator system 100 is activated by the safety controller 121 (e.g. by disconnecting the electric supply to the motor brake 115). After a stopping operation has been performed in this way, it is known for the elevator system 100 to be configured such that movement of the elevator car 101 cannot be restored until a maintenance person attends the elevator system 100, inspects the elevator system 100, and manually overrides the safety controller 121.

In certain circumstances, in which a determination is made that a first condition exists in the elevator system that represents an immediate danger to car occupants, the elevator safety brakes 134*a*, 134*b* may be activated by the ESAs 133*a*, 133*b* (e.g. in addition to the motor brake 115), in order to ensure the elevator car 101 is stopped as quickly as possible. For example, both the motor brake 115 and the elevator car safety brakes 134*a*, 134*b* may be activated in response to a determination of an overspeed condition by the absolute position reference system 125. If an emergency stopping operation is performed in this manner, and the elevator safety brakes 134*a*, 134*b* are activated, movement of the elevator car 101 cannot be restored until a maintenance person attends the elevator system 100, inspects the elevator system 100, manually overrides the safety controller 121 and additionally physically resets the elevator safety brakes 134*a*, 134*b*.

Performing any stopping of the elevator car in response to determination of a fault during normal operation ensures the safety of passengers inside the elevator car 101 or a maintenance person working on the elevator car 101 (referred to collectively in the following as 'car occupants'), but may cause complications for the car occupants. For example, if a stopping operation is performed when either a maintenance person is present on the roof of the elevator car 101, or when passengers are inside the elevator car 101, the car occupants will become trapped if the elevator car 101 is stopped between landings 105, as an override of the safety controller 121 is required in order to allow the elevator car 101 to be moved to a landing 105 within the hoistway 103.

In the case of a maintenance person trapped on the roof of the elevator car 101, a hoistway access ladder may be used to allow the maintenance person to reach the nearest landing 105, which may be between 1-2 metres from the roof of the elevator car 101, depending on where the stopping operation is performed in the hoistway 103. However, leaving the hoistway 103 in this way carries a risk of injury to the maintenance person, who must subsequently inspect the elevator system 100, and manually override the safety controller 121 to enable movement of the elevator car 101.

In the case of passengers trapped inside the elevator car 101, there is typically no means to allow escape from the elevator car 101 until a maintenance person attends the elevator system 100, inspects the elevator system 100, and manually overrides the safety controller 121.

Although such stopping operations are typically justified in order to reduce the risk to car occupants, occasionally an unnecessary stopping operation is automatically triggered in response to a 'non-critical' fault with the elevator system 100. Such 'non-critical' faults do not pose an immediate risk to the car occupants, although they may contribute to a hazardous situation if further faults occur.

For example, a stopping operation may be triggered automatically in response to a loss of connection between the safety controller 121 and a single safety device 138*a*, 138*b* of the pair of ESAs 133*a*, 133*b*, even though one of the car safety brakes 134*a*, 134*b* may remain operational. Similarly, a stopping operation may be performed in response to loss of one channel of a two channel absolute position reference system 125 (i.e. comprising safety devices 126*a*, 126*b*), despite one channel functioning correctly. Depending on the nature of the devices forming part of the safety chain, other scenarios, such as an associated component becoming overheated, may trigger a 'non-critical' stopping operation. It has been recognised that such stoppering operations are not necessary in the same way as an emergency stopping operation is absolutely required in response to the first condition being an overspeed condition.

In these circumstances, elevator passengers or an elevator maintenance person may become trapped within an elevator car 101 even when the risk level is relatively low. The present inventors have recognised that, as the risk to car occupants may be low, an immediate stopping operation may represent a disproportionate response that prevents the car occupants from being recovered from the hoistway 103 quickly and conveniently.

Figure 2:
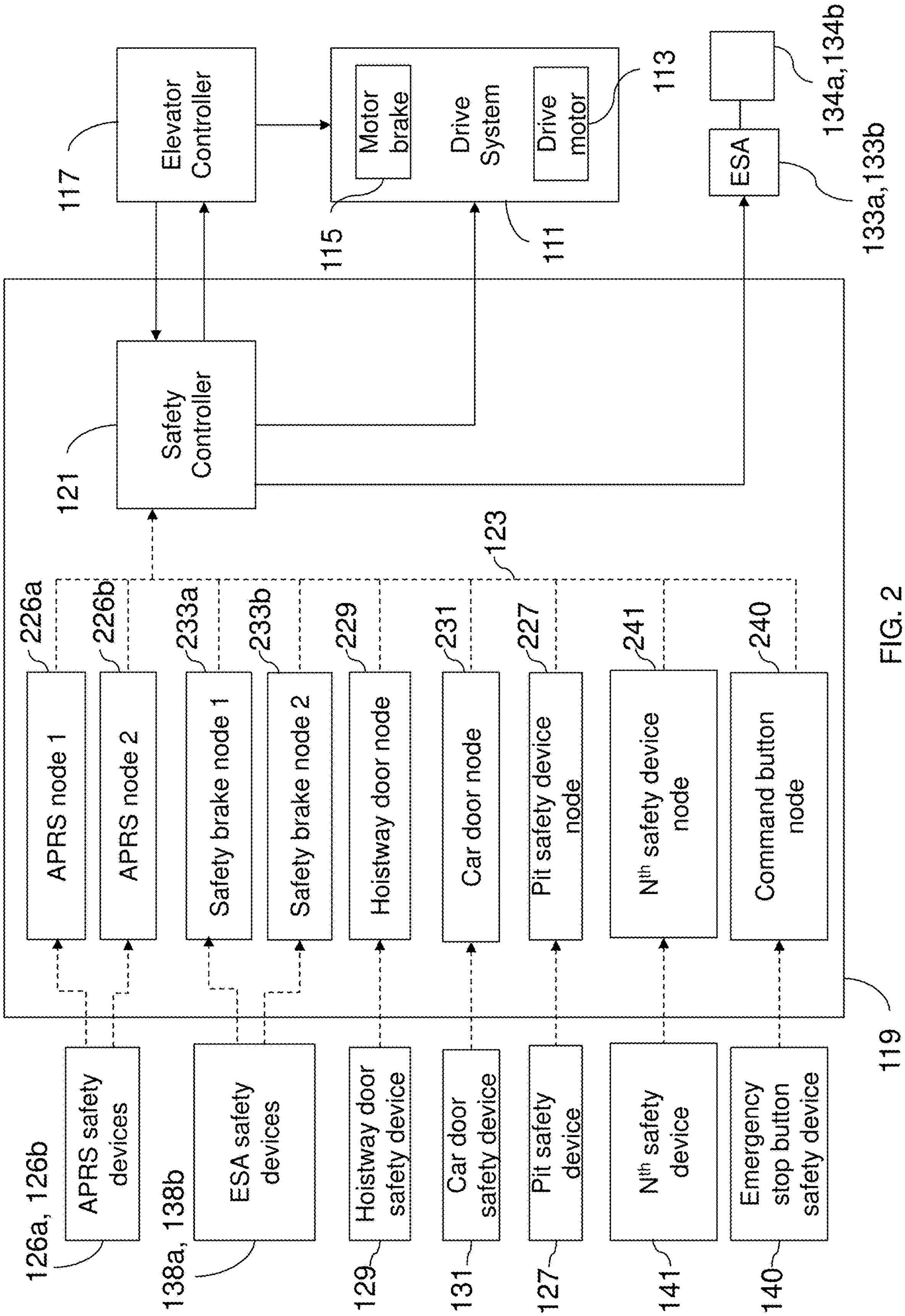
FIG. 2 is a schematic diagram showing a safety system and associated components, according to an example of the present disclosure.

An improved method of operating a safety system as shown in FIG. 2 that aims to address these issues is described below, with reference to FIGS. 2 and 3.

Figure 3:
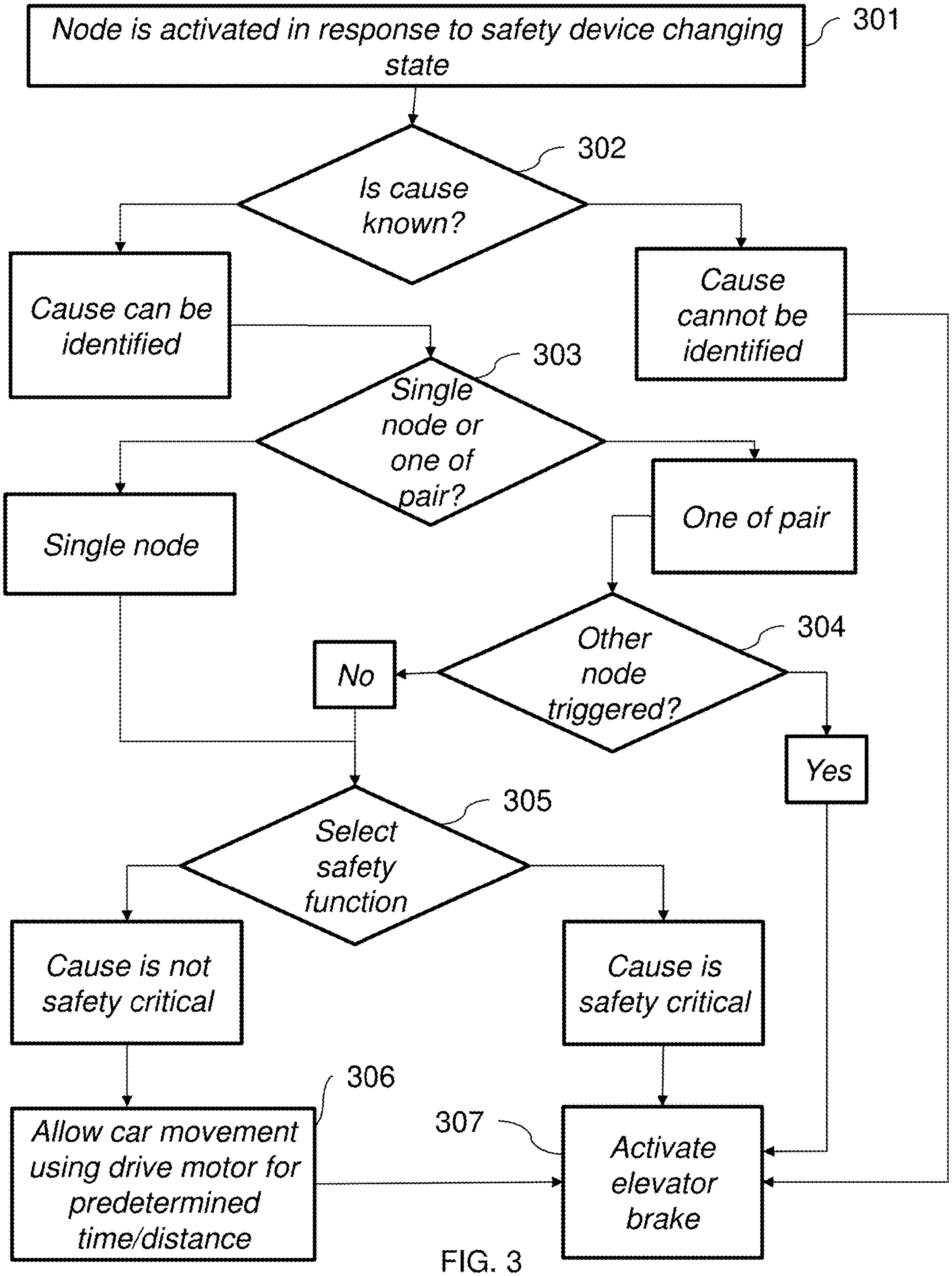
FIG. 3 is a flow diagram showing a method of operating an elevator system according to the present disclosure.

FIG. 3 shows a flow diagram illustrating a method of operating the safety system 119 of FIG. 2 in the elevator system of FIG. 1 in the event that one or more safety devices connected to the bus 123 change state.

In step 301, a safety device, e.g. one safety device 126*a* of the automatic position reference system 125, changes state, activating its respective APRS node 226*a*. This change of state of the safety device 126*a* causes a signal to be sent over the bus 123 which is received by the safety controller 121.

In step 302, the safety controller 121 determines whether the cause of the received signal can be identified, i.e. whether the node that was activated, and the safety device that caused the node to be activated, is known.

If the cause of the received signal cannot be identified, i.e. the safety controller 121 is unable to determine which node, and hence to which safety device the node relates, was activated, the process continues immediately to step 307, and a stopping operation is performed. In such a stopping operation, power to the elevator drive motor 113 is disconnected, and the motor brake 115 is activated by the safety controller 121, bringing the elevator car 101 to a stop regardless of its position within the elevator hoistway 103. This may therefore result in the elevator car 101 coming to a stop in a location between landings 105 of the elevator hoistway 103.

If the cause of the received signal can be identified, i.e. the safety controller 121 can determine which node, and hence to which safety device the node relates, was activated, the process continues to step 303.

In step 303, the safety controller 121 determines whether the detected node is connected to a standalone safety device (e.g. the hoistway door node 229), or is a node of a pair of nodes connected to two related safety devices (e.g. one safety device 126*a* of the automatic position reference system 125).

If the determined node is one of a pair of nodes, the safety controller 121 determines, in step 304, whether the other node of the pair has also been activated. If the other node of the pair has been activated, it is determined that neither safety device of this pair is operational, and the process continues to step 307, in which a stopping operation is immediately performed, as described above.

If the other node of the pair has not been activated, or the determined node is a single node, the process continues to step 305, in which the safety controller 121 determines what action should be taken based on the node that has been activated, i.e. based on the associated condition of the elevator system 100.

For each activated node or combination of nodes (i.e. based on the state of each safety device), a condition of the elevator system 100 may be preset. The condition of the elevator system determines a corresponding safety function to be performed by the safety controller 121. This function may be set in advance and stored in a memory of the safety controller 121. Specifically, having identified the node that has been activated, the safety controller 121 performs one of two safety functions based on the condition of the elevator system, determined by the identified node.

If the identified node is connected to a safety device that relates to a 'safety critical' fault in the elevator system 100, the elevator system 100 is determined to be in a first condition, and the process continues to step 307, in which a stopping operation is immediately performed, as described above.

However, if the identified node is connected to a safety device that relates to a 'non-critical' fault in the elevator system 100, the elevator system 100 is determined to be in a second condition and the process instead continues to step 306, in which actions are taken to prevent entrapment of elevator car occupants.

Unlike in conventional elevator systems, in which a stopping operation is performed as soon as any safety device forming part of the safety chain is opened, the disclosed system may delay stopping in the event that the change of state of the safety device relates to a 'non-critical' fault. Rather than stopping the elevator car 101 immediately, which may result in the elevator car 101 coming to rest in an area of the hoistway 103 located far from a landing 105, potentially trapping passengers within the elevator car 101 or a maintenance person working on the elevator car 101, further movement of the elevator car 101 may be temporality permitted. Specifically, movement of the elevator car 101 using the drive motor 113 under the control of the safety controller 121 for a predetermined duration of time (e.g. three minutes) or a predetermined distance (e.g. one floor) is made possible in order to allow the car to be moved to the nearest landing 105, where car occupants can safely leave the elevator car 101, before performing a final stopping operation.

Thus, if during normal operation of the elevator car 101, the determined node is connected to a safety device that relates to a 'non-critical' fault in the elevator system 100 (i.e. the elevator system is in the second condition), the safety controller 121 may transmits a signal to the elevator controller 117 indicating that a stopping operation will be initiated after a predetermined duration of time, or after the elevator car 101 has moved a predetermined distance, and the safety controller 121 controls the elevator car 101 to move to the nearest landing 105. Once the elevator car 101 is present at the nearest landing 105, the safety controller 121 determines that the elevator car 101 is stopped at the landing 105 and the process continues to step 307, as described above. If no such determination is made, the safety controller 121 nonetheless performs a stopping operation after either the predetermined duration has passed, or after the elevator car 101 has travelled the predetermined distance.

If the determination that the node is connected to a safety device that relates to a 'non-critical' fault in the elevator system 100 (i.e. the elevator system 100 is in the first condition) is made during a maintenance operation, e.g. operating in an inspection mode in which a maintenance person is present on the roof of the elevator car 101, the safety controller 121 transmits a signal to the elevator controller 117 indicating that a stopping operation is required.

In response, the elevator controller 117 informs the maintenance person on the roof of the elevator car 101 that a fault has been detected and a stopping operation is required, e.g. using a visual and/or audible alarm 139 located in the elevator hoistway 103. On hearing this alarm, the maintenance person controls the elevator car 101 to move to the nearest landing 105. Movement of the elevator car 101 may be controlled using the inspection operation control box 136 located on the roof of the elevator car 101, through which commands can be sent to the safety controller 121 to control the drive motor 113. Once the elevator car 101 is present at the landing 105, the maintenance person may signal to the safety controller 121 that a stopping operation can now be performed, and the process continues to step 307 as described above. If no such signal is received, the safety controller 121 nonetheless performs a stopping operation after either the predetermined duration has passed, or after the elevator car 101 has travelled the predetermined distance.

In this way, the elevator car 101 may be moved to the nearest landing 105 before a stopping operation is performed in certain circumstances, preventing elevator passengers within the elevator car 101, or a maintenance person on the roof of the elevator car 101 from becoming trapped in the hoistway 103 between landings.

In order to preserve the safe operation of the elevator system, a stopping operation is nonetheless performed after a predetermined time has elapsed or the elevator car 101 has moved a predetermined distance. After such an a stopping operation, movement of the elevator car 101 cannot be restored until a maintenance person attends the elevator system 100, inspects the elevator system 100, and manually overrides the safety controller 121, as is conventional.

It will be appreciated by those skilled in the art that the disclosure has been illustrated by describing one or more specific aspects thereof, but is not limited to these aspects; many variations and modifications are possible, within the scope of the accompanying claims.

What is claimed is:

1. An elevator system (100), comprising:

an elevator car (101) and a drive system (111) configured to drive movement of the elevator car (101);

an elevator controller (117), configured to control operation of the elevator car (101);

a safety controller (121); and a plurality of safety devices (**126*a*, 126*b*, 127, 129, 131, 138*a*, 138*b*, 140, 141) connected to the safety controller (121), wherein the plurality of safety devices (126*a*, 126*b*, 127, 129, 131, 138*a*, 138*b*, 140, 141) monitor the elevator system (100**);

wherein the safety controller (121) is configured to receive a signal in response to a change of state of any of the safety devices (**126*a*, 126*b*, 127, 129, 131, 138*a*, 138*b*, 140, 141**);

wherein, after receiving a signal in response to a change of state of one or more of the safety devices (**126*a*, 126*b*, 127, 129, 131, 138*a*, 138*b*, 140, 141), the safety controller (121) determines a condition of the elevator system (100**);

wherein if the safety controller (121) renders a determination that the elevator system (100) is in a first condition, the safety controller (121) causes an elevator brake (115) to be deployed, preventing movement of the elevator car (101); and wherein if the safety controller (121) renders a determination that the elevator system (100) is in a second condition, the safety controller (121) allows movement of the elevator car (101) for a predetermined duration or until the elevator car (101) has travelled a predetermined distance.

2. The elevator system (100) of claim 1, wherein after receiving a signal in response to a change of state of one or more of the safety devices (**126*a*, 126*b*, 127, 129, 131, 138*a*, 138*b*, 140, 141) and rendering a determination that the elevator system (100) is in the second condition, the safety controller (121) causes an elevator brake (115) to be deployed after the predetermined duration has elapsed or after the elevator car (101**) has travelled the predetermined distance.

3. The elevator system of claim 1, wherein the safety controller (121) is arranged to move the elevator car (101) to the nearest landing (105) upon rendering a determination that the elevator system (100) is in the second condition.

4. The elevator system (100) of claim 3, further comprising an inspection operation control box (136) located on the roof of the elevator car (101), wherein the safety controller (121) is arranged to move the elevator car (101) in response to commands input through a user interface of the inspection operation control box (136).

5. The elevator system (100) of claim 1, wherein the elevator brake is a brake (115) in the drive system (111).

6. The elevator system (100) of claim 1, wherein the plurality of safety devices (126*a*, 126*b*, 127, 129, 131, 138*a*, 138*b*, 140, 141) is connected to the safety controller (121) by a common bus (123), to form a safety chain for the elevator system (100).

7. The elevator system (100) of claim 1, wherein after receiving a signal in response to a change of state of one or more of the safety devices (126*a*, 126*b*, 127, 129, 131, 138*a*, 138*b*, 140, 141), the safety controller (121) causes an alarm (139) to be triggered.

8. The elevator system (100) of claim 7, wherein the alarm (139) provides a visual and/or audible indicator within the elevator hoistway (103) and/or within the elevator car (101).

9. The elevator system (100) of claim 1, wherein at least one of the plurality of safety devices (126*a*, 126*b*, 127, 129, 131, 138*a*, 138*b*, 140, 141) is connected to a position determination system (125) configured to detect the speed of the elevator car (101); wherein the at least one safety device (126*a*, 126*b*) is configured to change state if the elevator car (101) speed is determined to be greater than a threshold speed; wherein the safety controller (121) is configured to receive a signal in response to the change of state of the at least one safety device (126*a*, 126*b*), to determine that the first condition is an overspeed condition, and to cause an elevator car safety brake (134*a*, 134*b*) to be deployed.

10. A method of controlling an elevator system (100) comprising an elevator car (101), an elevator controller (117), and a safety controller (121) connected to a plurality of safety devices (126*a*, 126*b*, 127, 129, 131, 138*a*, 138*b*, 140, 141) arranged to monitor the elevator system (100), the method comprising:

receiving a signal indicating that a change of state of at least one of the safety devices (126*a*, 126*b*, 127, 129, 131, 138*a*, 138*b*, 140, 141) has occurred; and determining a condition of the elevator system (100) based on the change of state;

wherein, in response to a determination that the elevator system (100) is in a first condition, the method further comprises:

causing an elevator brake (115) to be deployed; and preventing movement of the elevator car (101); and wherein, in response to a determination that the elevator system (101) is in a second condition, the method further comprises:

allowing movement of the elevator car (101) for a predetermined duration or until the elevator car (101) has travelled a predetermined distance.

11. The method of claim 10, wherein upon determining that the elevator system (100) is in the second condition, the method further comprises: causing an elevator brake (115) to be deployed after the predetermined duration has elapsed or after the elevator car (101) has travelled the predetermined distance.

12. The method of claim 10, wherein upon determining that the elevator system (100) is in the second condition, the method further comprises: moving the elevator car (101) to the nearest landing (105).

13. The method of claim 12, wherein moving the elevator car (101) comprises receiving a command input from an inspection operation control box (136), and wherein the method further comprises moving the elevator car (101) in response to the command.

14. The method of claim 10, wherein upon receiving a signal in response to a change of state of one or more of the safety devices (126*a*, 126*b*, 127, 129, 131, 138*a*, 138*b*, 140, 141), the method further comprises: triggering an alarm.

15. The method of claim 10, wherein at least one of the plurality of safety devices (126*a*, 126*b*, 127, 129, 131, 138*a*, 138*b*, 140, 141) is connected to a position determination system (125); and wherein the method further comprises:

detecting, using the position determination system (125), the speed of the elevator car (101);

determining if the speed of the elevator car (101) is greater than a threshold;

causing the at least one safety device (126*a*, 126*b*, 127, 129, 131, 138*a*, 138*b*, 140, 141) to change state if the speed of the elevator car (101) is greater than the threshold;

receiving a signal in response to the change of state of the at least one safety device (126*a*, 126*b*, 127, 129, 131, 138*a*, 138*b*, 140, 141);

determining that the first condition is an overspeed condition;

and causing an elevator car safety brake (134*a*, 34*b*) to be deployed.

* * * * *